United States Patent
Zhu et al.

(10) Patent No.: US 8,934,837 B2
(45) Date of Patent: Jan. 13, 2015

(54) MOBILE WIRELESS COMMUNICATIONS DEVICE INCLUDING NFC ANTENNA MATCHING CONTROL CIRCUIT AND ASSOCIATED METHODS

(71) Applicant: Research In Motion Limited, Waterloo (CA)

(72) Inventors: Lizhong Zhu, Waterloo (CA); Libo Zhu, Waterloo (CA); Robert Michael Philip Gondosch, Waterloo (CA); Craig Stuart MacKenzie, Guelph (CA)

(73) Assignee: BlackBerry Limited, Waterloo, Ontario (CA)

( * ) Notice: Subject to any disclaimer, the term of this patent is extended or adjusted under 35 U.S.C. 154(b) by 196 days.

(21) Appl. No.: 13/733,487

(22) Filed: Jan. 3, 2013

(65) Prior Publication Data

US 2014/0187153 A1     Jul. 3, 2014

(51) Int. Cl.
*H04B 5/00*     (2006.01)
*H04B 5/02*     (2006.01)

(52) U.S. Cl.
CPC ............... *H04B 5/02* (2013.01); *H04B 5/0025* (2013.01); *H04B 5/0012* (2013.01); *H04B 5/0081* (2013.01); *H04B 5/0087* (2013.01)
USPC .................... 455/41.1; 340/568.1; 340/572.1; 345/156; 705/41

(58) Field of Classification Search
CPC ...... H04B 5/02; H04B 5/0087; H04B 5/0081; H04B 5/0025; H04B 5/0012; H04W 4/008; H04M 2250/04
USPC ......... 455/41.1, 41.2, 410, 558, 575.5, 575.7, 455/562.1
See application file for complete search history.

(56) References Cited

U.S. PATENT DOCUMENTS

| | | | |
|---|---|---|---|
| 7,541,930 B2 | 6/2009 | Saarisalo et al. | |
| 8,457,699 B2* | 6/2013 | Ayatollahi | 455/575.7 |
| 8,509,808 B2* | 8/2013 | Krutt et al. | 455/456.1 |
| 8,594,566 B2* | 11/2013 | Zhu et al. | 455/41.1 |
| 8,660,612 B2* | 2/2014 | Zhu et al. | 455/562.1 |
| 8,676,116 B2* | 3/2014 | Zhu et al. | 455/41.1 |
| 8,688,043 B2* | 4/2014 | Lewin | 455/41.2 |
| 8,744,357 B2* | 6/2014 | Zhu et al. | 455/41.2 |
| 8,755,744 B2* | 6/2014 | Zhu et al. | 455/41.1 |
| 8,798,536 B2* | 8/2014 | Behin | 455/41.1 |
| 8,811,894 B2* | 8/2014 | Cordier | 455/41.1 |
| 2007/0008140 A1 | 1/2007 | Saarisalo et al. | |
| 2010/0060432 A1 | 3/2010 | Van Niekerk et al. | |
| 2012/0135681 A1 | 5/2012 | Adams et al. | |
| 2012/0214412 A1 | 8/2012 | Schlub et al. | |
| 2013/0196597 A1* | 8/2013 | Aldana et al. | 455/41.1 |
| 2014/0127993 A1* | 5/2014 | Frankland | 455/41.1 |

FOREIGN PATENT DOCUMENTS

| | | |
|---|---|---|
| WO | 2007109451 | 9/2007 |
| WO | 2012143936 | 10/2012 |

* cited by examiner

*Primary Examiner* — Marceau Milord
(74) *Attorney, Agent, or Firm* — Allen, Dyer, Doppelt, Milbrath & Gilchrist, P.A.

(57) ABSTRACT

A mobile wireless communications device includes a near-field communications (NFC) transceiver, NFC antennas and an NFC control circuit. The NFC transceiver generates a received signal strength based on a received signal from an adjacent NFC device. The NFC control circuit includes an antenna switch circuit coupled between the NFC transceiver and the NFC antennas. A capacitance sensing circuit is coupled to the NFC antennas to determine capacitance values thereof. A processor operates the antenna switch circuit based upon the received signal strength and the capacitance values.

23 Claims, 7 Drawing Sheets

100
MOBILE WIRELESS COMMUNICATIONS DEVICE INCLUDING NFC ANTENNA MATCHING CONTROL CIRCUIT AND ASSOCIATED METHODS

TECHNICAL FIELD

The present disclosure generally relates to the field of wireless communications systems, and, more particularly, to mobile wireless communications devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION OF THE PREFERRED EMBODIMENTS

Figure 1:
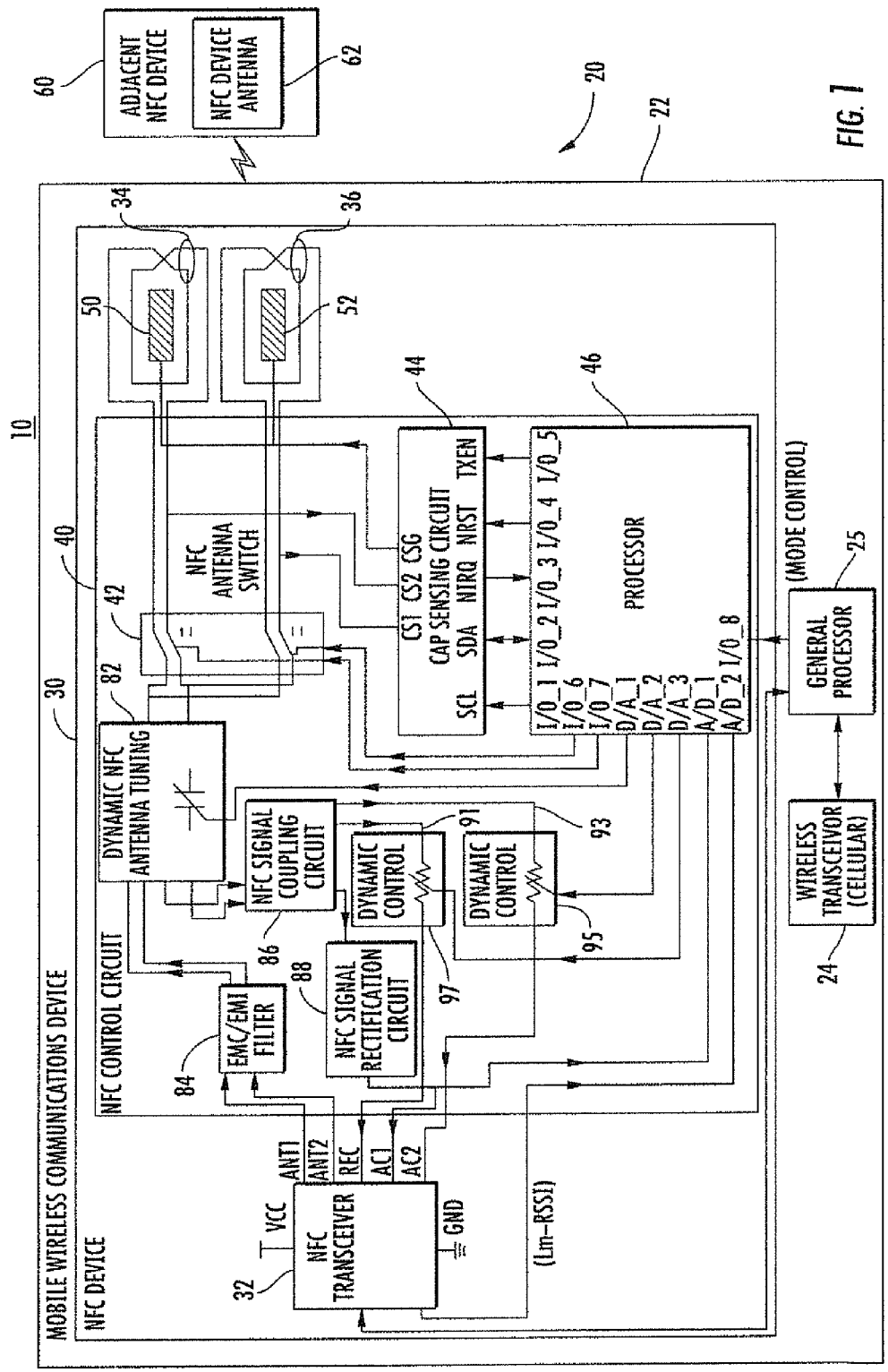
FIG. 1 is a schematic block diagram of a communications system including a mobile wireless communications device with an NFC antenna matching control circuit in accordance with an example embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notations are used to indicate similar elements in alternative embodiments.

Generally speaking, a mobile wireless communications device includes a near-field communications (NFC) transceiver, a plurality of NFC antennas, and an NFC control circuit. The NFC transceiver may generate a received signal strength based on a received signal from an adjacent NFC device. The NFC control circuit may include an antenna switch circuit, a capacitance sensing circuit, and a processor. The antenna switch circuit may be coupled between the NFC transceiver and the plurality of NFC antennas. The capacitance sensing circuit may be coupled to the plurality of NFC antennas to determine capacitance values thereof. The processor may operate the antenna switch circuit based upon the received signal strength and the capacitance values.

The adjacent NFC device includes an NFC device antenna. The processor may be configured to determine at least one of the following based on the received signal strength and the capacitance values to operate the antenna switch: a distance to the NFC device antenna, a size of the NFC device antenna, and a center of the NFC device antenna.

The processor advantageously selects one or more of the NFC antennas in the mobile wireless communications device to improve interfacing with the NFC device antenna in the adjacent NFC device. Adequate reading distances may be maintained by the mobile wireless communications device regardless of the size of the NFC device antenna.

The capacitance sensing circuit advantageously senses proximity of the adjacent NFC device, as well as other objects, including a user's hand blocking the NFC device antenna in the NFC device. The capacitance sensing circuit may comprise a plurality of capacitance sensors, with each NFC antenna having a capacitance sensor associated therewith. Each capacitance sensor may comprise a pair of spaced apart plates, with a first plate adjacent a respective NFC antenna which functions as a second plate cooperating with the first plate. When the plurality of NFC antennas are embedded, then the first plate may be shared by the embedded NFC antennas.

The NFC control circuit may further comprise an NFC antenna tuning circuit coupled between the NFC transceiver and the antenna switch circuit to dynamically tune and match the NFC antennas with the NFC antenna in adjacent NFC device. The received signal strength may advantageously be used to determine if the NFC antennas need to be tuned.

The NFC control circuit may further comprise a signal rectification circuit coupled to the NFC antenna tuning circuit to provide a peak-to-peak voltage signal. The processor may control the NFC antenna tuning circuit based on the peak-to-peak voltage signal.

The NFC control circuit may further comprise a signal coupling circuit coupled to the antenna switch circuit and includes a reader mode output signal path and a card emulation mode output signal path. A card emulation mode dynamic control circuit may be coupled to the card emulation mode output signal path. A reader mode dynamic control circuit may be coupled to the reader mode output signal path. The processor may be configured to adjust a dynamic range of a signal received by the card emulation mode dynamic control circuit when the NFC control circuit is in a card emulation mode, and to adjust a dynamic range of a signal received by the reader mode dynamic control circuit when the NFC control circuit is in a reader mode. The signal received by the reader mode dynamic control circuit may include the received signal from the adjacent NFC device used by the NFC transceiver to generate the received signal strength.

Referring initially to FIG. 1, a communications system 10 illustratively includes a mobile wireless communications device 20. Example mobile wireless communications devices may include portable or personal media players (e.g., music or MP3 players, video players, etc.), portable gaming devices, portable or mobile telephones, smartphones, tablet computers, digital cameras, etc.

The mobile wireless communications device 20 is also generally referred to as a mobile device, and includes a portable housing 22, and a wireless transceiver 24 and a general processor 25 carried by the portable housing 22. The wireless transceiver 24 may comprise a cellular transceiver or other types of wireless communications transceivers, and may communicate any combination of voice and data, such as, for example, email. The general processor 25 interfaces between the wireless transceiver 24 and a near-field communications (NFC) device 30 also carried by the portable housing 22.

The NFC device 30 is configured to communicate with an adjacent NFC device 60 or terminal that is part of the communications system 10 based upon proximity thereto using NFC communications. The adjacent NFC device 60 may be an NFC tag, an NFC-enabled mobile device, a smart poster, etc.

By way of background, NFC is a short-range wireless communications technology in which NFC-enabled devices 20, 60 are "swiped," "bumped" or otherwise moved in close proximity to communicate. In one non-limiting example implementation, NFC may operate at 13.56 MHz and with an effective range of about 10 cm, but other suitable versions of near-field communications which may have different operating frequencies, effective ranges, etc., for example, may also be used.

The NFC device 30 includes an NFC transceiver 32, a plurality of NFC antennas 34, 36, and an NFC control circuit 40. The NFC transceiver 32 is configured to generate a received signal strength based on a received signal from the adjacent NFC device 60. The received signal is a demodulated load modulation signal when the NFC device is in the reader mode.

The NFC control circuit 40 includes an antenna switch circuit 42 coupled between the NFC transceiver 30 and the NFC antennas 34, 36, and a capacitance sensing circuit 44 coupled to the NFC antennas. The NFC control circuit 40 includes a processor 46 to operate the antenna switch circuit 42 based upon the received signal strength and the capacitance values provided by the capacitive sensing circuit 44.

The capacitance sensing circuit 44 senses proximity of the adjacent NFC device 60, as well as other objects, including a user's hand blocking the NFC device antenna 62. The capacitance sensing circuit 44 includes a plurality of capacitance sensors, with each NFC antenna 34, 36 having a capacitance sensor associated therewith.

Each capacitance sensor includes a pair of spaced apart plates, with a first plate 50 or 52 adjacent a respective NFC antenna 34 or 36 and a second plate defined by an outer coil of the same respective NFC antenna 34 or 36. That is, each respective NFC antenna functions as a plate for the capacitance sensor associated therewith.

Figure 2:
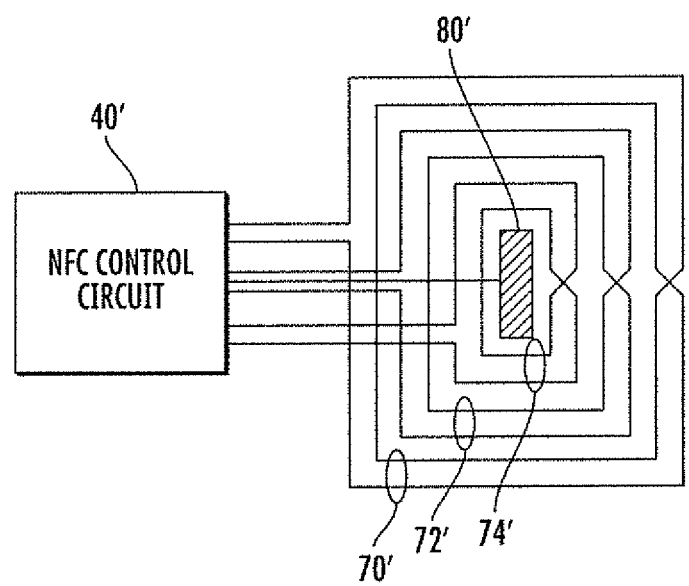
FIG. 2 is a schematic block diagram an alternative embodiment of the NFC antennas coupled to the NFC antenna matching control circuit for the mobile wireless communications device illustrated in FIG. 1.

In an alternative embodiment, the NFC antennas may be embedded, as illustrated in FIG. 2. In this embodiment, all three NFC antennas 70', 72', 74' share a common plate 80'. The second plate of each capacitance sensor is defined by an outer coil of a respective one of the NFC antennas 70', 72', 74'.

The adjacent NFC device 60 includes an NFC device antenna 62. Depending on the configuration of the adjacent NFC device 60, the NFC device 30 operates in either a reader mode or a card emulation mode. A mode control signal from the general processor 25 to the processor 46 in the NFC control circuit 40 places the NFC device 30 in either the reader mode or the card emulation mode.

The processor 46 is configured to determine at least one of the following for operating the antenna switch 42 based on the received signal strength of a received signal from the adjacent NFC device 60, and the capacitance values detecting proximity of the adjacent NFC device 60: a distance to the NFC device antenna 62, a size of the NFC device antenna, and a center of the NFC device antenna.

The processor 46 advantageously selects one or more of the NFC antennas 50, 52 to improve interfacing with the NFC device antenna 62 in the adjacent NFC device 60. Since the reading distance can vary significantly between large and small size NFC device antennas, adequate reading distances may be maintained by the mobile wireless communications device 20 regardless of the size of the NFC device antenna 62. For example, one of the illustrated NFC antennas 34 may be positioned at the top of the mobile wireless communications device 20, whereas the other NFC antenna 36 NFC antennas 34 may be positioned at the bottom. Depending on the position of the mobile wireless communications device 20 with respect to the adjacent NFC device 60, the top or bottom NFC antenna 34, 36 is appropriately selected. In some cases, both NFC antennas 34, 36 may be selected. In addition to the capacitance sensing circuit 44 sensing proximity of the adjacent NFC device 60, other objects may be detected, including a user's hand holding the mobile wireless communications device 20.

The NFC control circuit 40 further includes an NFC antenna tuning circuit 82 coupled between the NFC transceiver 32 and the antenna switch circuit 42. The NFC antenna tuning circuit 82 provides different amplitude and phase modulated transmit signals in the reader mode, and different load modulation signals in the card emulation mode to the respective NFC antenna 34, 36. The NFC antenna tuning circuit 82 also provides proper coupling between the NFC antennas 34, 36 and the NFC transceiver receive ports REC and AC2.

An EMC/EMI filter 84 is coupled between the NFC antenna tuning circuit 82 and the NFC transceiver 32. The EMC/EMI filter 84 is typically a low pass filter to reduce harmonics and out-of-phase noise of an NFC signal transmitted at 13.56 MHz. The EMC/EMI filter 84 is coupled to ANT1 and ANT2, which are differential outputs of the NFC transceiver 32. The ANT1 and ANT2 differential outputs provide a modulated signal to an NFC antenna when the NFC device 30 is in the reader mode, and conducts load modulation when the NFC device 30 is in the card emulation mode. Alternatively, the ANT1 and ANT2 outputs may be configured as a common-mode output.

AN NFC signal coupling circuit 86 can properly couple and distribute NFC transmit and receive signals in both the reader and card emulation modes to the following inputs of the NFC transceiver 32: REC, AC1 and AC2. The REC input receives a load modulated signal during the reader mode. The AC1 input is referred to as an energy harvest input, and receives a rectified signal from an NFC signal rectification circuit 88 in both the reader and card emulation modes. The AC2 input is an NFC input in the card emulation mode, and receives a modulated signal from the adjacent NFC device 60 when operating as an NFC reader.

The processor 46 is used to conduct smart NFC signal control and antenna tuning based on the capacitance values provided by the capacitance sensing circuit 44, a rectified signal provided from the NFC signal rectification circuit 88 to the AC1 input, the load modulation receiver signal strength indicator (LM_RSSI), and the mode control signal placing the NFC device 30 in the reader mode or the card emulation mode.

The NFC signal rectification circuit 88 rectifies a signal from the NFC signal coupling circuit 86 and provides the rectified DC signal to the AC1 input and to the A/D_1 input of the processor 46. The processor 46 digitizes this signal which is used as a sensing signal for the purpose of dynamic NFC antenna tuning. In particular, the rectified DC signal is a peak-to-peak voltage signal, and the processor 46 controls the NFC antenna tuning circuit 82 based on the peak-to-peak voltage signal.

The NFC signal coupling circuit 86 includes a reader mode output signal path 91 and a card emulation mode output signal path 93. A card emulation mode dynamic control circuit 95 is coupled to the card emulation mode output signal path 93. A reader mode dynamic control circuit 97 is coupled to the reader mode output signal path 91.

The processor 46 adjusts a dynamic range of a signal received by the card emulation mode dynamic control circuit 95 when the NFC control circuit 40 is in a card emulation mode, and adjusts a dynamic range of a signal received by the reader mode dynamic control circuit 97 when the NFC control circuit is in a reader mode. The signal received by the reader mode dynamic control circuit 97 includes the received signal from the adjacent NFC device 60 used by the NFC transceiver 32 to generate the received signal strength.

Figure 3:
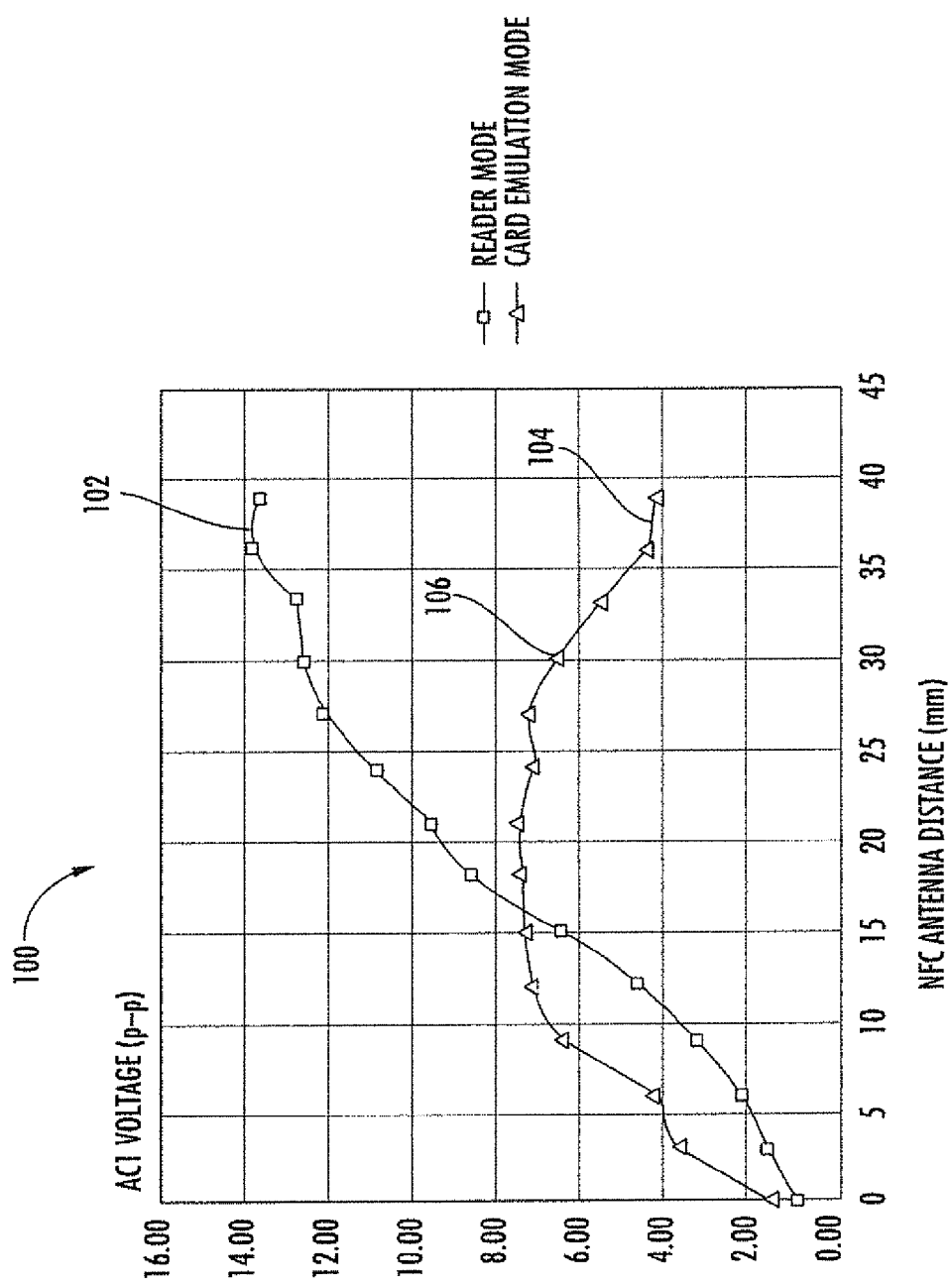
FIG. 3 is a graph illustrating signal strength curves when the NFC control circuit operates in a reader mode and in a card emulation mode in accordance with an example embodiment.

Referring now to FIG. 3, graph 100 illustrates signal strength curves when the NFC control circuit 40 operates in a reader mode and in a card emulation mode. Curve 102 corresponds to the NFC control circuit 40 operating in the reader mode, and curve 104 corresponds to the NFC control circuit operating in the card emulation mode. As readily appreciated by those skilled in the art, when the NFC antennas 34, 36 are detuned, the RF performance of the NFC device 40 operating as a reader and a card emulator is significantly degraded, and may even fail their proper NFC functions.

FIG. 3 thus demonstrates signal strength curves at input AC1 of the NFC transceiver 32 with respect to an NFC antenna coupling distance in the two respective modes of operation. For curve 102 corresponding to the reader mode, the drop of AC1 peak-to-peak voltage is inversely proportional to the distance between the reader's antenna and the card emulator's antenna. The shorter the distance, the bigger the drop of AC1 peak-to-peak voltage. Therefore, the voltage at AC1 in the reader mode is an indication of how strong the magnetic field can be generated at an NFC antenna. This AC1 voltage drop is directly related to the detuned reader's NFC antenna by the NFC card emulator.

For curve 104 corresponding to the card emulation mode, the AC1 peak-to-peak voltage will drop when the distance is shortened. This is also due to the detuned card emulator's NFC antenna by the closely coupled reader's NFC antenna. On the other hand, when the distance is over 30 mm, as indicated at point 106, the AC1 voltage slowly drops when the distance increases. As discussed above, the AC1 peak-to-peak voltage is an indicator of how much magnetic energy it can harvest from the reader. The longer the distance is, the less energy that can be collected.

Figure 4:
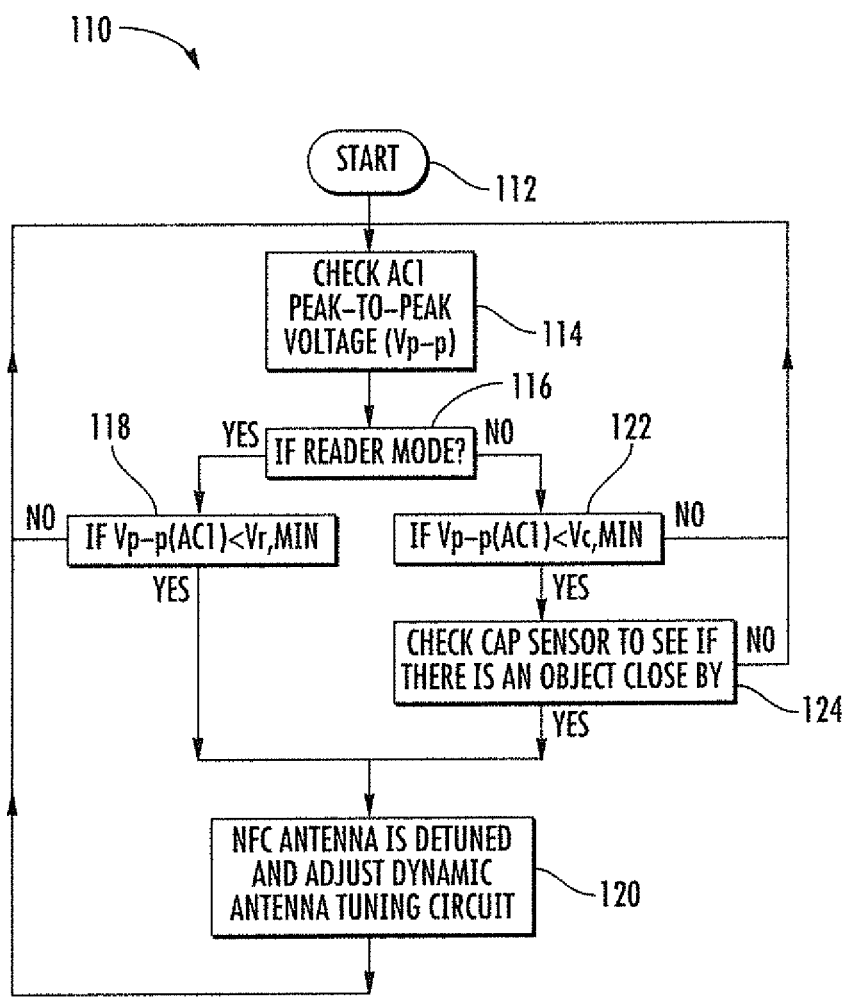
FIG. 4 is a flowchart illustrating the steps for tuning the NFC antennas based on the different operating modes provided in FIG. 3.

Therefore, the AC1 peak-to-peak voltage signal may be used as an antenna detuning indicator, as provided by the flow chart 110 in FIG. 4, whereas the capacitance values provided by the capacitance sensing circuit 44 may be used a distance indicator. This allows the processor 46 to correctly tell if the drop of AC1 peak-to-peak voltage (Vp-p) is due to the antenna detuning caused by the short distance and heavy antenna coupling, where Vr,min and Vc,min are the minimum Vp-p that set the thresholds to judge if an NFC antenna is to be tuned in the reader and card emulation modes, respectively.

Still referring to FIG. 4, from the start (Block 112), the processor 46 checks the AC1 peak-to-peak voltage (Vp-p) at Block 114. At Block 116, a determination is made as to what mode the NFC control circuit 40 has been placed in. If in the reader mode, the AC1 peak-to-peak voltage is compared to a reader mode threshold at Block 118. If the AC1 peak-to-peak voltage is less than the reader mode threshold, the process returns to Block 114 for another AC1 peak-to-peak voltage check. If the AC1 peak-to-peak voltage is greater than the reader mode threshold, the process continues to Block 120 where the NFC antenna is to be tuned. After antenna tuning, the process returns to Block 114 for another AC1 peak-to-peak voltage check.

If at Block 116, a determination is made that the NFC control circuit 40 has been placed in the card emulator more, then the AC1 peak-to-peak voltage is compared to a card emulator mode threshold at Block 122. If the AC1 peak-to-peak voltage is greater than the card emulator mode threshold, the process returns to Block 114 for another AC1 peak-to-peak voltage check. If the AC1 peak-to-peak voltage is less than the card emulator mode threshold, the process continues to Block 124 where a determination is made at the capacitance sensing circuit 44 on if an object in close proximity has been detected. If no object has been detected, then the process returns to Block 114. If an object has been detected, then the NFC antenna is to be tuned at Block 120. After antenna tuning, the process returns to Block 114 for another AC1 peak-to-peak voltage check.

As part of the NFC antenna tuning, either NFC antenna 34 or NFC antenna 36 will be selected, or both of the NFC antennas may be selected. This is provided by I/O_6 and I/O_7 of the processor 46 to achieve the goal of generating an increased magnetic field strength to an NFC card emulator. The dynamic control circuit is adjusted to achieve an improved receiving dynamic range at REC. Based on the selected NFC antenna(s) and the received signal strength of the received signal, the reader mode dynamic control circuit 97 is adjusted by the processor 46.

The card emulator dynamic control circuit 95 is adjusted by the processor 46 to achieve an improved receiving dynamic range at input AC2. This adjustment is based on the received signal strength of the received signal, and the selected NFC antenna(s).

A strong load modulation via an NFC antenna coupling may be achieved by modulating ANT1 and ANT2 in the card emulation mode. Based on capacitance values from the capacitance sensing circuit 44 and the AC2 reading, a determination can be made on a hand holding pattern by the user by switching both NFC antennas 34, 36 on one at a time. Then, the processor 46 checks AC1 to see if the NFC antenna(s) are detuned. If yes, the NFC antenna is tuned to achieve an increased AC1 Vp-p. After that, a decision is made if both antennas should be switched on, or just one of them for improving load modulation performance. Finally, a load modulation is conducted via ANT1 and ANT2.

As noted, the NFC device 30 may be configured to operate in the reader mode or in the card emulation mode. In addition, the NFC device 30 may also be configured to operate in a peer-to-peer mode. The different modes will now be discussed in greater detail.

In the reader mode, the NFC control circuit 40 is configured to detect the distance of the adjacent NFC device 60, a size of the NFC device antenna 62 in the adjacent NFC device, a center of the NFC device antenna in the adjacent NFC device, and hand holding patterns of the user. Based on this information, the NFC antenna switch 42 selects NFC antenna 34 or NFC antenna 36, or both. Next, a check is made to see if the selected NFC antenna is detuned. If detuned, the NFC antenna is tuned so as to generate an increased magnetic energy. The reader mode dynamic control circuit 95 is adjusted to improve receiving dynamic range at the REC input (i.e., the receiver input can handle an increased range (from low to high level) of a load modulated signal from the adjacent NFC device 60.

In the card emulation mode, the NFC control circuit 40 is configured to detect the distance of the adjacent NFC device 60, a size of the NFC device antenna 62 in the adjacent NFC device, a center of the NFC device antenna in the adjacent NFC device, and hand holding patterns of the user. Based on this information, the NFC antenna switch 42 selects NFC antenna 34 or NFC antenna 36, or both. Next, a check is made to see if the selected NFC antenna is detuned. If detuned, the NFC antenna is tuned so as to generate an increased magnetic energy. The card emulator mode dynamic control circuit 97 is adjusted to improve receiving dynamic range at the AC2 input. The strongest possible load modulation is provided via the NFC antenna coupling by modulating NFC antenna 34 and NFC antenna 36 (i.e., switching the NFC antennas 34, 36 on and off according to a load modulating signal).

In a peer-to-peer mode, depending on the negotiations between two mobile wireless communications devices, one mobile wireless communications device will become a NFC reader and the other mobile wireless communications device will be an NFC card emulator. In this mode, reference is directed to the flow chart in 110 in FIG. 4.

Figure 5:
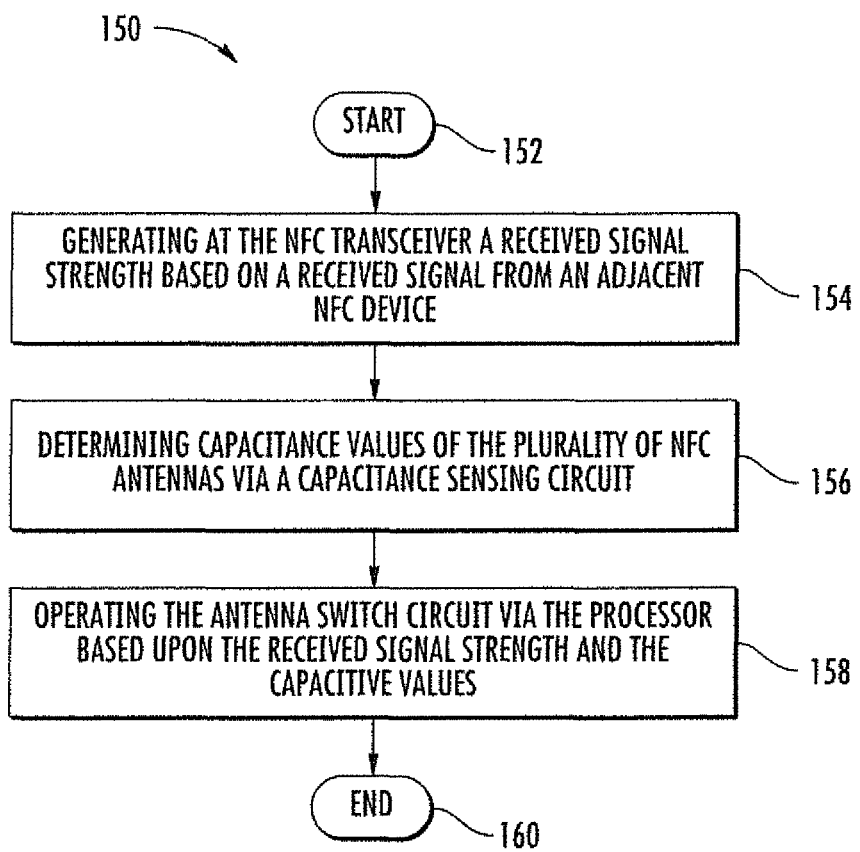
FIG. 5 is a flowchart illustrating a method for operating the mobile wireless communications device provided in FIG. 1.
Figure 6:
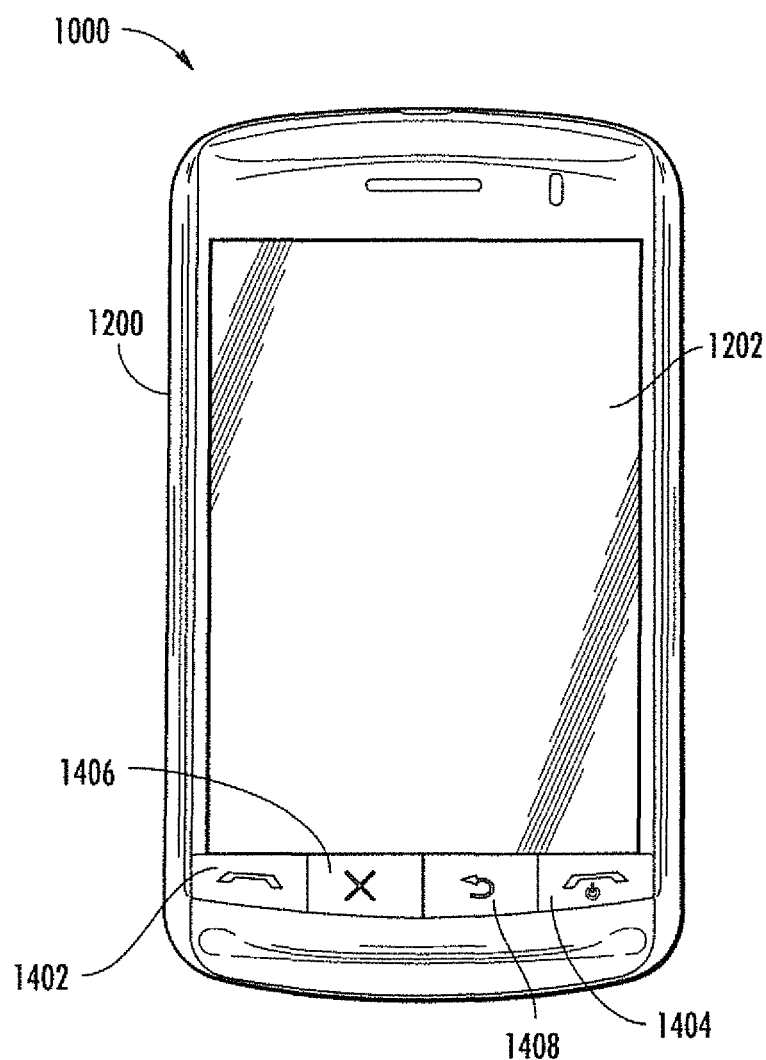
FIG. 6 is a front view of a mobile wireless communications device in accordance with another exemplary aspect.
Figure 7:
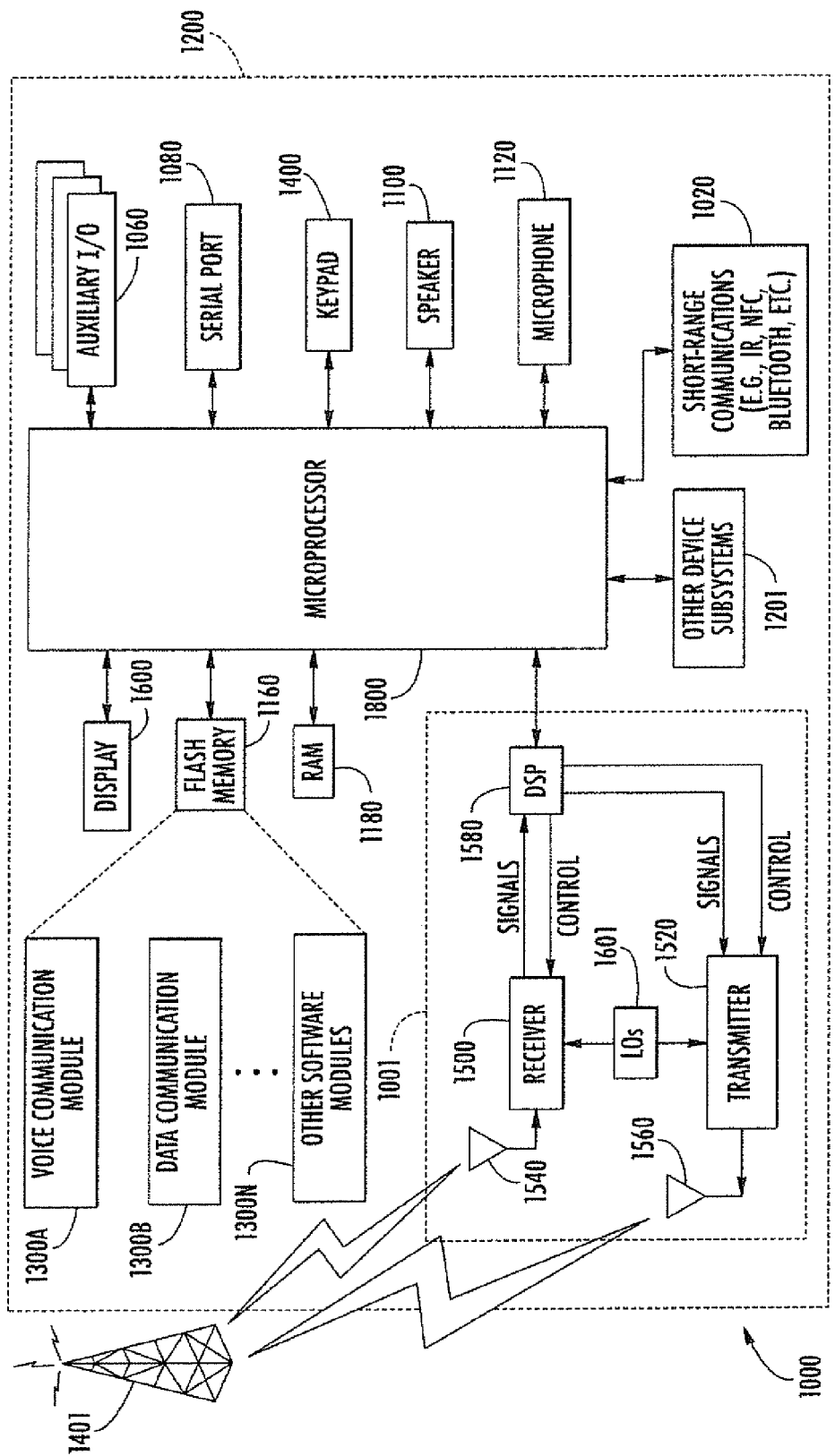
FIG. 7 is a schematic block diagram illustrating additional components that may be included in the mobile wireless communications device illustrated in FIG. 6.

Another aspect is directed to a method for operating a mobile wireless communications device 20 as described above. Referring now to the flow chart 150 in FIG. 5, from the start (Block 152), the method comprises at Block 154 generating at the NFC transceiver 32 a received signal strength based on a received signal from an adjacent NFC device 60. Capacitance values of the plurality of NFC antennas 34, 36 are determined at Block 156 via the capacitance sensing circuit 44. The antenna switch circuit 42 is operated at Block 158 via the processor 46 based upon the received signal strength and the capacitive values. The method ends at Block 160.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
    a near-field communications (NFC) transceiver configured to generate a received signal strength based on a received signal from an adjacent NFC device;
    a plurality of NFC antennas; and
    an NFC control circuit comprising
        an antenna switch circuit coupled between said NFC transceiver and said plurality of NFC antennas,
        a capacitance sensing circuit coupled to said plurality of NFC antennas and configured to determine capacitance values thereof, and
        a processor configured to operate said antenna switch circuit based upon the received signal strength and the capacitance values.

2. The mobile wireless communications device according to claim 1 wherein said capacitance sensing circuit comprises a plurality of capacitance sensors, with each NFC antenna having a capacitance sensor associated therewith.

3. The mobile wireless communications device according to claim 2 wherein each capacitance sensor comprises a first plate adjacent a respective NFC antenna which functions as a second plate cooperating with the first plate.

4. The mobile wireless communications device according to claim 2 wherein the adjacent NFC device comprises an NFC device antenna; and wherein said processor is configured to determine at least one of the following based on the received signal strength and the capacitance values to operate said antenna switch: a distance to the NFC device antenna, a size of the NFC device antenna, and a center of the NFC device antenna.

5. The mobile wireless communications device according to claim 1 wherein said NFC control circuit further comprises an NFC antenna tuning circuit coupled between said NFC transceiver and said antenna switch circuit.

6. The mobile wireless communications device according to claim 5 wherein said NFC control circuit further comprises a signal rectification circuit coupled to said NFC antenna tuning circuit and configured to provide a peak-to-peak voltage signal; and wherein said processor is configured to control said NFC antenna tuning circuit based on the peak-to-peak voltage signal.

7. The mobile wireless communications device according to claim 1 wherein said NFC control circuit further comprises:
    a signal coupling circuit coupled to said antenna switch circuit and comprising a reader mode output signal path and a card emulation mode output signal path;
    a card emulation mode dynamic control circuit coupled to the card emulation mode output signal path; and
    a reader mode dynamic control circuit coupled to the reader mode output signal path;
    wherein said processor is configured to adjust a dynamic range of a signal received by said card emulation mode dynamic control circuit when said NFC control circuit is in a card emulation mode, and to adjust a dynamic range of a signal received by said reader mode dynamic control circuit when said NFC control circuit is in a reader mode.

8. The mobile wireless communications device according to claim 7 wherein the signal received by said reader mode dynamic control circuit includes the received signal from the adjacent NFC device used by said NFC transceiver to generate the received signal strength.

9. The mobile wireless communications device according to claim 1 wherein said processor is configured to receive a control signal to operate said NFC control circuit in a card emulation mode or in a reader mode.

10. A mobile wireless communications device comprising:
    a near-field communications (NFC) transceiver configured to generate a received signal strength based on a received signal from an adjacent NFC device;
    a plurality of NFC antennas; and
    an NFC control circuit comprising
        an antenna switch circuit coupled between said NFC transceiver and said plurality of NFC antennas, a capacitance sensing circuit comprising a plurality of capacitance sensors coupled to said plurality of NFC antennas, and configured to determine capacitance values thereof, and a processor configured to receive a control signal to operate said NFC control circuit in a card emulation mode or in a reader mode, and operate said antenna switch circuit based upon the received signal strength and the capacitance values.

11. The mobile wireless communications device according to claim 10 wherein with each NFC antenna has a capacitance sensor associated therewith, and wherein each capacitance sensor comprises a pair of spaced apart plates, with a first plate adjacent a respective NFC antenna which functions as a second plate cooperating with the first plate 12. The mobile wireless communications device according to claim 10 wherein said NFC control circuit further comprises an NFC antenna tuning circuit coupled between said NFC transceiver and said antenna switch circuit.

13. The mobile wireless communications device according to claim 12 wherein said NFC control circuit further comprises a signal rectification circuit coupled to said NFC antenna tuning circuit and configured to provide a peak-to-peak voltage signal; and wherein said processor is configured to control said NFC antenna tuning circuit based on the peak-to-peak voltage signal.

14. The mobile wireless communications device according to claim 10 wherein said NFC control circuit further comprises:

a signal coupling circuit coupled to said antenna switch circuit and comprising a reader mode output signal path and a card emulation mode output signal path;

a card emulation mode dynamic control circuit coupled to the card emulation mode output signal path; and a reader mode dynamic control circuit coupled to the reader mode output signal path;

wherein said processor is configured to adjust a dynamic range of a signal received by said card emulation mode dynamic control circuit when said NFC control circuit is in a card emulation mode, and to adjust a dynamic range of a signal received by said reader mode dynamic control circuit when said NFC control circuit is in a reader mode.

15. A method for operating a mobile wireless communications device comprising a near-field communications (NFC) transceiver; a plurality of NFC antennas; and an NFC control circuit comprising an antenna switch circuit coupled between the NFC transceiver and plurality of NFC antennas, a capacitance sensing circuit coupled to the plurality of NFC antennas, and a processor coupled to the antenna switch circuit and to the capacitive sensing circuit, the method comprising:

generating at the NFC transceiver a received signal strength based on a received signal from an adjacent NFC device;

determining capacitance values of the plurality of NFC antennas via a capacitance sensing circuit; and operating the antenna switch circuit via the processor based upon the received signal strength and the capacitive values.

16. The method according to claim 15 wherein the capacitance sensing circuit comprises a plurality of capacitance sensors, with each NFC antenna having a capacitance sensor associated therewith.

17. The method according to claim 16 wherein each capacitance sensor comprises a pair of spaced apart plates, with first plate adjacent a respective NFC antenna and a first plate adjacent a respective NFC antenna which functions as a second plate cooperating with the first plate.

18. The method according to claim 16 wherein the adjacent NFC device comprises an NFC device antenna; and wherein operating the antenna switch further comprises operating the processor to determine at least one of the following based on the received signal strength and the capacitance values to operate the antenna switch: a distance of the adjacent NFC device, a size of the NFC device antenna, and a center of the NFC device antenna.

19. The method according to claim 15 wherein the NFC control circuit further comprises an NFC antenna tuning circuit coupled between the NFC transceiver and the antenna switch circuit, the method further comprising controlling the NFC antenna tuning circuit to tune at least one of the plurality of NFC antennas.

20. The method according to claim 15 wherein the NFC control circuit further comprises a signal rectification circuit coupled to the NFC antenna tuning circuit to provide a peak-to-peak voltage signal; and wherein controlling the NFC antenna tuning circuit is based on the peak-to-peak voltage signal.

21. The method according to claim 15 wherein the NFC control circuit further comprises a signal coupling circuit coupled to the antenna switch circuit and comprising a reader mode output signal path and a card emulation mode output signal path; a card emulation mode dynamic control circuit coupled to the card emulation mode output signal path; a reader mode dynamic control circuit coupled to the reader mode output signal path; the method further comprising: operating the processor to adjust a dynamic range of a signal received by the card emulation mode dynamic control circuit when the NFC control circuit is in a card emulation mode; and operating the processor to adjust a dynamic range of a signal received by the reader mode dynamic control circuit when the NFC control circuit is in a reader mode.

22. The method according to claim 21 wherein the NFC transceiver is coupled to the reader mode dynamic control circuit, and the signal received by the reader mode dynamic control circuit includes the received signal from the adjacent NFC device used by the NFC transceiver to generate the received signal strength.

23. The method according to claim 15 wherein operating the processor comprises operating the processor to operate the NFC control circuit in a card emulation mode or in a reader mode based on receiving a control signal.

* * * * *